(12) United States Patent
Snider

(10) Patent No.: US 8,538,657 B2
(45) Date of Patent: Sep. 17, 2013

(54) SYSTEMS AND METHODS FOR CONTROLLING FUEL FLOW TO A TURBINE COMPONENT

(75) Inventor: David August Snider, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 469 days.

(21) Appl. No.: 12/432,867

(22) Filed: Apr. 30, 2009

(65) Prior Publication Data

US 2010/0280731 A1   Nov. 4, 2010

(51) Int. Cl.
*F02C 7/22* (2006.01)

(52) U.S. Cl.
USPC .............................. 701/100; 60/734

(58) Field of Classification Search
USPC ............... 701/100–105, 108; 123/295, 683, 123/478, 527, 528; 60/773, 286, 284, 274, 60/776, 734, 39.281, 295, 303; 702/12, 45, 702/100, 50; 700/282, 29, 30; 73/49.2, 114.45, 73/114.48, 114.49, 114.51
See application file for complete search history.

(56) References Cited

U.S. PATENT DOCUMENTS

| | | | | |
|---|---|---|---|---|
| 5,873,235 A | * | 2/1999 | Bosley et al. | 60/777 |
| 6,526,358 B1 | * | 2/2003 | Mathews et al. | 702/51 |
| 7,400,967 B2 | * | 7/2008 | Ueno et al. | 701/104 |
| 7,481,061 B2 | * | 1/2009 | Gadde et al. | 60/778 |
| 7,549,293 B2 | * | 6/2009 | Gallagher et al. | 60/773 |
| 7,707,814 B2 | * | 5/2010 | Sonoda et al. | 60/39.281 |
| 2003/0094000 A1 | * | 5/2003 | Zagranski et al. | 60/773 |
| 2003/0192300 A1 | * | 10/2003 | Mahoney et al. | 60/39.281 |
| 2004/0011050 A1 | * | 1/2004 | Inoue | 60/773 |
| 2004/0114666 A1 | * | 6/2004 | Hardwicke et al. | 374/179 |
| 2006/0150633 A1 | * | 7/2006 | McGinley et al. | 60/773 |
| 2006/0201132 A1 | * | 9/2006 | Hirayama et al. | 60/39.27 |
| 2007/0028602 A1 | * | 2/2007 | Dalla Betta et al. | 60/286 |
| 2007/0101724 A1 | * | 5/2007 | Gadde et al. | 60/773 |
| 2008/0041063 A1 | * | 2/2008 | Feiz | 60/773 |
| 2008/0243401 A1 | * | 10/2008 | Viele | 702/50 |
| 2008/0310949 A1 | * | 12/2008 | Kondo et al. | 415/47 |
| 2009/0271085 A1 | * | 10/2009 | Buchalter et al. | 701/100 |
| 2010/0107603 A1 | * | 5/2010 | Smith | 60/267 |
| 2010/0122535 A1 | * | 5/2010 | Finkbeiner | 60/734 |
| 2010/0252009 A1 | * | 10/2010 | Barth et al. | 123/657 |

* cited by examiner

*Primary Examiner* — Marthe Marc-Coleman
(74) *Attorney, Agent, or Firm* — Sutherland Asbill & Brennan LLP

(57) ABSTRACT

Systems and methods for controlling fuel flow to a turbine component are provided. One or more parameters associated with a fuel flow to a turbine component may be monitored. The fuel flow may be modeled based at least in part on the one or more monitored parameters. The fuel flow may be adjusted to a target flow based at least in part on the modeling of the fuel flow.

20 Claims, 5 Drawing Sheets

SYSTEMS AND METHODS FOR CONTROLLING FUEL FLOW TO A TURBINE COMPONENT

FIELD OF THE INVENTION

Embodiments of the invention relate generally to turbines and more specifically to systems, methods, and apparatus for controlling fuel flow to a turbine or turbine component.

BACKGROUND OF THE INVENTION

Gas turbines and other types of turbines are utilized in a wide variety of applications, such as in power plants for power generation. During the operation of a gas turbine, a supply of a compressible fuel, such as a gas fuel, is typically provided as fuel to a combustor that ignites the gas to provide power to rotate a turbine. The gas is typically supplied to the combustor by one or more pipes or channels, and the flow of the gas through the one or more pipes is typically controlled by one or more respective control valves.

The positioning of the valves is typically adjusted to control the amount of gas or the gas flow that is supplied to the combustor. For example, a valve may be partially closed to reduce the gas flow supplied to the combustor. However, due to the compressibility of the gas and/or the bleeding of gas through the pipes, there is a transient period in which the gas flow to the combustor will adjust to the new gas flow level at the control valve. Conventional turbine control systems typically assume that gas flow is adjusted to a new flow instantaneously or almost instantaneously when a valve is adjusted. However, because the conventional turbine control systems do not take the compressibility of the gas into account, the gas flow supplied to the combustor is typically adjusted gradually during transient events. These gradual changes in gas flow may lead to losses of efficiency within the turbine. Additionally, in some cases, such as a load rejection situation in which the gas flow should be decreased quickly, gradual changes in gas flow may lead to loss of flame in the combustor or wear and tear on turbine components and a reduced life cycle for the turbine components.

Thus, there is a need for improved systems, methods, and apparatus to control compressible fuel flow to a combustor or other component of a turbine. There is also a need for improved systems, methods, and apparatus to model the flow of a compressible fuel that is provided to a turbine.

BRIEF DESCRIPTION OF THE INVENTION

Some or all of the above needs and/or problems may be addressed by certain embodiments of the invention. Embodiments of the invention may include systems, methods, apparatus, and computer program products for controlling fuel flow in a turbine. According to one embodiment of the invention, there is disclosed a method for controlling fuel flow in a turbine. One or more parameters associated with a fuel flow to a turbine component may be monitored. The fuel flow may be modeled based at least in part on the one or more monitored parameters. The fuel flow may be adjusted to a target flow based at least in part on the modeling of the fuel flow.

According to another embodiment of the invention, there is disclosed a system for controlling fuel flow to a turbine. The system may include one or more sensors and one or more processors. The one or more sensors may be operable to monitor one or more parameters associated with a fuel flow to a turbine component. The one or more processors may be operable to receive measurements data from the one or more sensors and utilize at least a portion of the received measurements data to model the fuel flow. The one or more processors may be further operable to adjust the fuel flow to a target flow based at least in part on the modeling of the fuel flow.

According to yet another embodiment of the invention, there is disclosed a method for controlling a valve associated with a fuel flow to a turbine component. Data associated with the fuel flow downstream of the valve may be measured. A behavior of the fuel flow may be predicted based at least in part on the data and on one or more functional capabilities of the valve. The positioning of the valve may be adjusted to alter the fuel flow based at least in part on the predicted behavior of the fuel flow.

Additional systems, methods, apparatus, features, and aspects are realized through the techniques of various embodiments of the invention. Other embodiments and aspects of the invention are described in detail herein and are considered a part of the claimed invention. Other embodiments and aspects can be understood with reference to the description and the drawings.

BRIEF DESCRIPTION OF THE DRAWINGS

Figure 1:
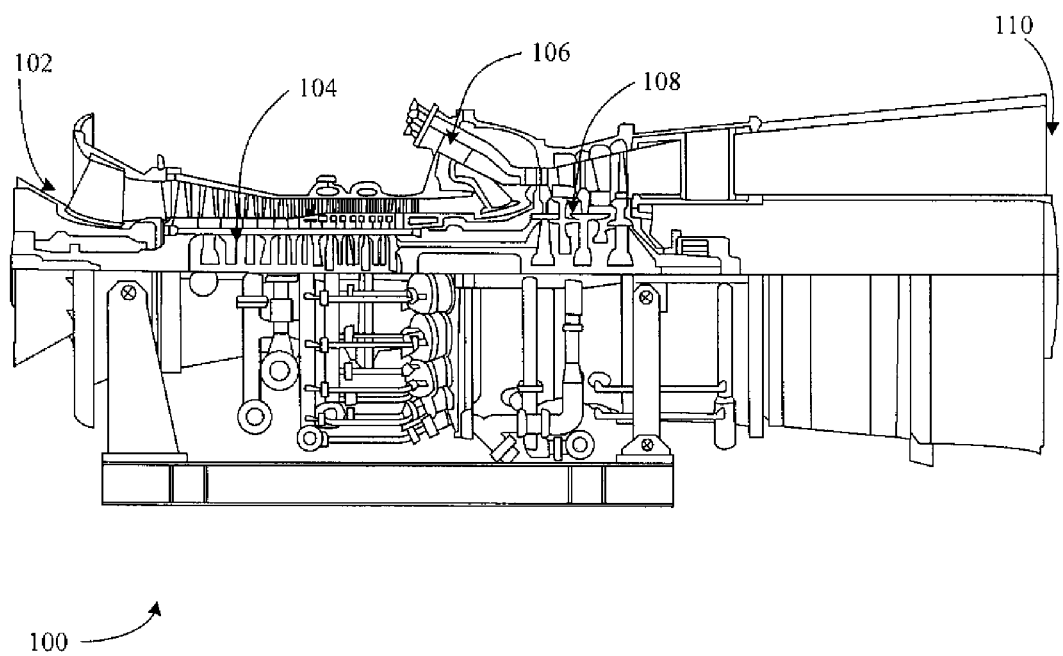

Having thus described the invention in general terms, reference will now be made to the accompanying drawings, which are not necessarily drawn to scale, and wherein:

FIG. 1 is a cross-sectional view of one example gas turbine that may be utilized in association with various embodiments of the invention.

Figure 2:
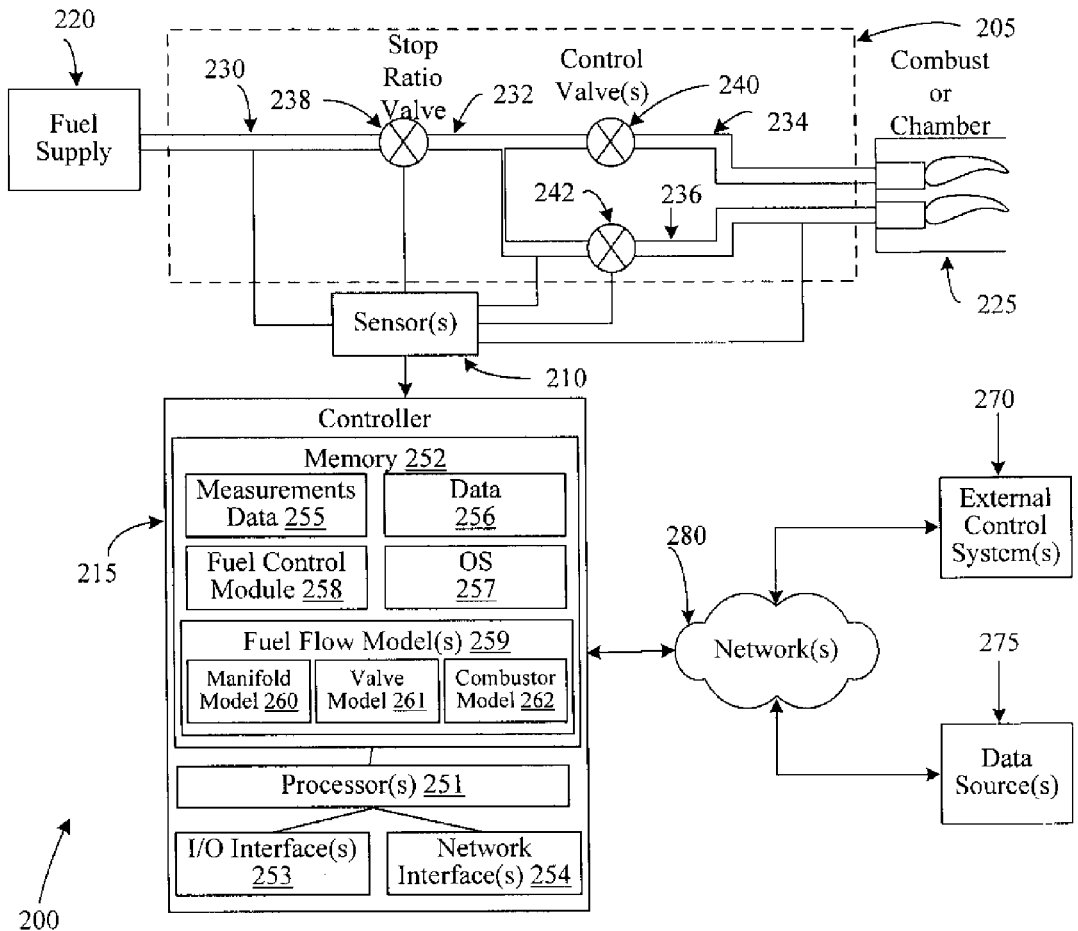

FIG. 2 is a block diagram of one example system that may be utilized to control fuel flow to a turbine, according to an illustrative embodiment of the invention.

Figure 3:
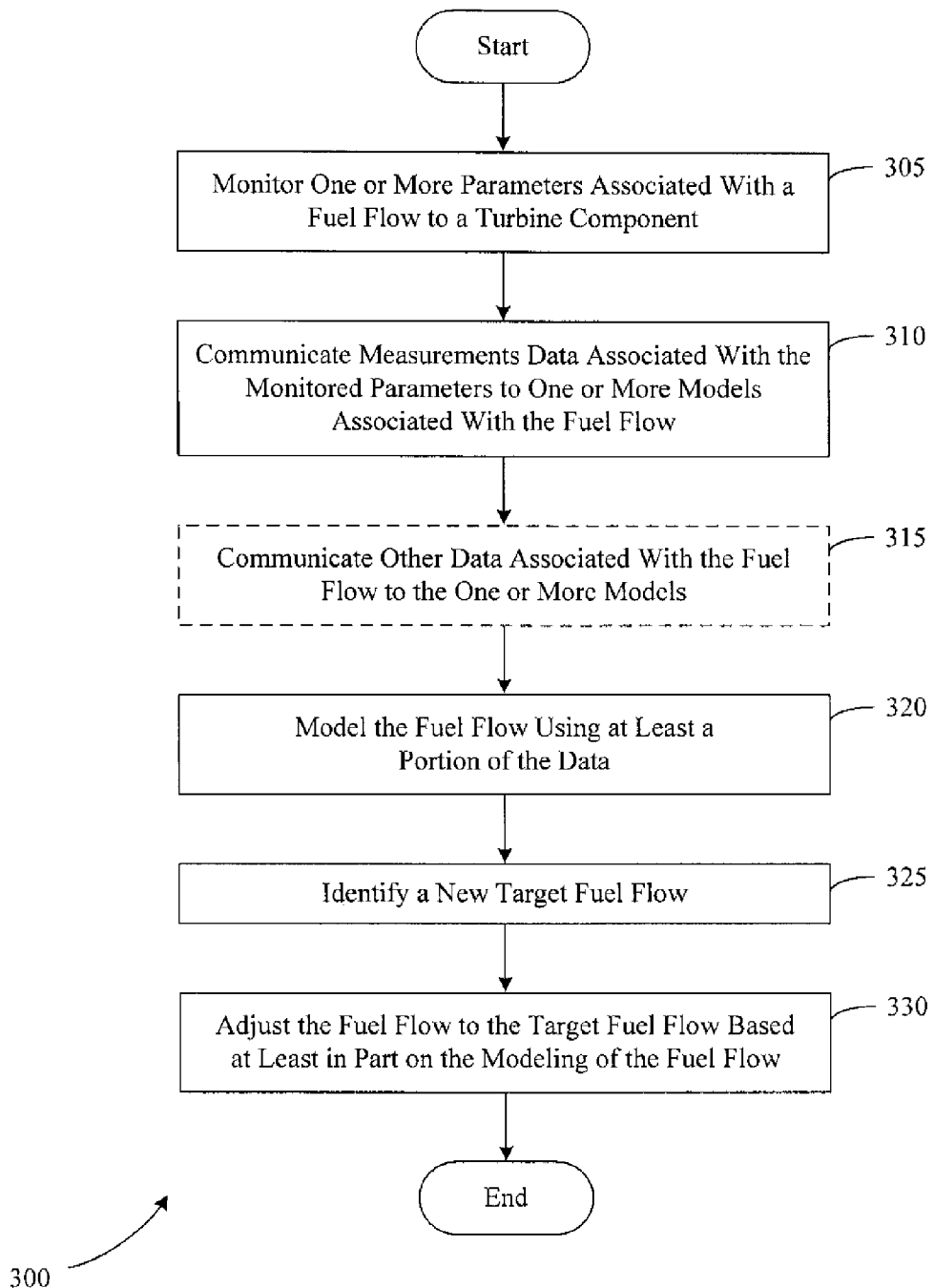

FIG. 3 is a flow chart of one example method for controlling fuel flow to a turbine, according to an illustrative embodiment of the invention.

Figure 4A:
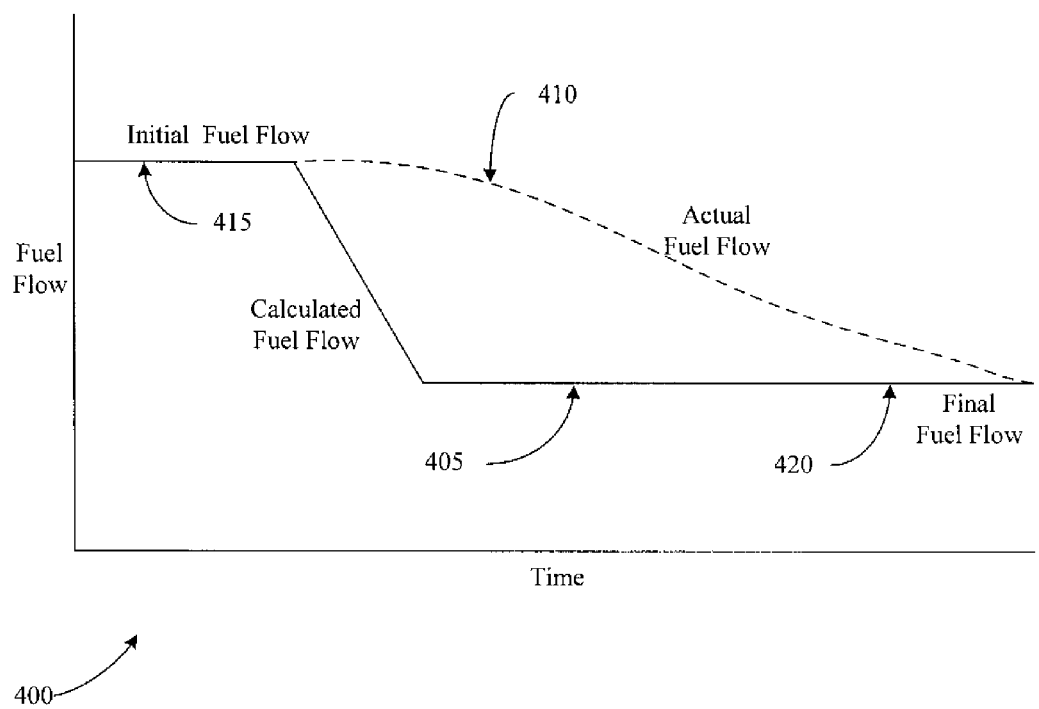
Figure 4B:
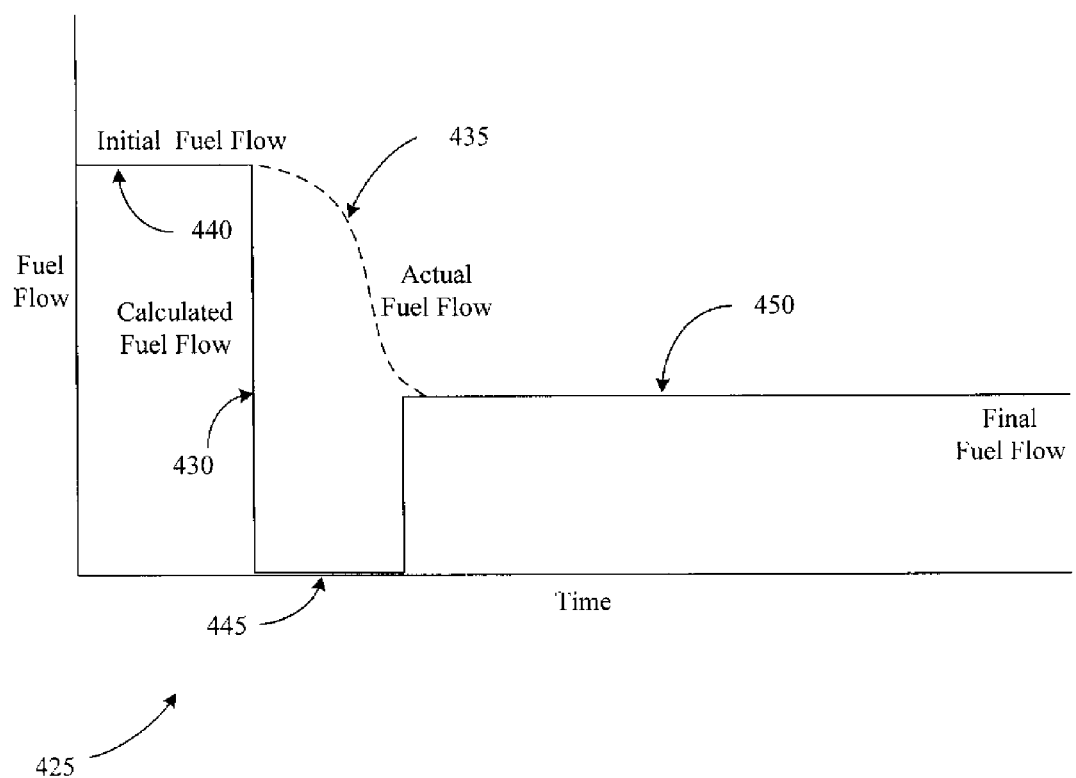

FIGS. 4A-4B are charts that illustrate example changes in fuel flow that may be facilitated by various embodiments of the invention.

DETAILED DESCRIPTION OF THE INVENTION

Illustrative embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Disclosed are systems, methods and apparatus for controlling fuel flow to a turbine or to a turbine component. Various embodiments of the invention may include one or more sensors that facilitate monitoring parameters associated with a fuel flow to a turbine component, for example, a gas fuel flow to a combustor of a gas turbine. One or more suitable control units may receive measurements data associated with the monitored parameters and utilize at least a portion of the received measurements data to model the fuel flow. A wide variety of factors may be taken into account when modeling the fuel flow, for example, the compressible nature of the fuel and/or the functionality of one or more valves that are utilized to control the fuel flow. When a change in fuel flow is desired, the one or more control units may adjust the fuel flow to a target flow based at least in part on the modeling of the fuel flow. As a result of modeling the fuel flow, the fuel flow may be adjusted and controlled relatively aggressively. In this regard, adjustments to fuel flow may be achieved in a relatively efficient manner.

Various embodiments of the invention may include one or more special purpose computers, systems, and/or particular machines for controlling fuel flow to a turbine component or a turbine. A special purpose computer or particular machine may include a wide variety of different software modules as desired in various embodiments. As explained in greater detail below, in certain embodiments, these various software components may be utilized to provide a relatively accurate and stable behavioral representation of a fuel flow to and/or within a turbine component or turbine. The behavioral representation or model may be utilized to control the fuel flow. For example, the behavioral representation or model may be utilized to relatively aggressively actuate or otherwise control valves that facilitate the supply of fuel to a turbine component or turbine.

Embodiments of the invention described herein may have the technical effect of providing control for the supply of fuel to a turbine component, turbine, or other machine. Additionally, embodiments of the invention may have the technical effect of modeling and/or predicting the flow of fuel to and/or in a turbine component, turbine, or other machine. The modeling and/or predicting of the fuel flow may be utilized to control and/or adjust the fuel flow.

Embodiments of the invention may be utilized in association with a wide variety of different turbines and/or other machines. FIG. 1 illustrates a cross-sectional view of one example of a gas turbine 100 in which embodiments of the invention may be utilized. Although a gas turbine 100 is illustrated in FIG. 1, embodiments of the invention may be utilized in a wide variety of different machines that receive and/or utilize a compressible fuel supply or a compressible flow including, but not limited to, gas turbines, steam turbines, and other turbines utilized for various aviation, industrial, and/or power generation applications. For example, embodiments of the invention may be utilized to control a compressible flow of steam within a steam turbine.

With reference to FIG. 1, the illustrated gas turbine 100 may include an intake section 102, a compressor section 104, a combustor section 106, a turbine section 108, and an exhaust section 110. In general operation, air may enter through the intake section 102 and may be compressed to a predefined or predetermined pressure in the compressor section 104. At least a portion of the compressed air from the compressor section 104 may be supplied to the combustor section 106. In the combustor section 106, the compressed air may be mixed with a fuel and then the combined air and fuel mixture may be combusted. The combustion of the air and fuel mixture in the combustion section 106 may produce hot gases having a relatively high temperature and a relatively high pressure. The hot gases coming out of the combustion section 106 may be expanded in the turbine section 108 of the gas turbine 100. The turbine section 108 may convert the energy of the hot gases to rotation energy. Following the expansion of the hot gases in the turbine section 108, relatively low pressure hot gases may be sent out from the gas turbine 100 through the exhaust section 110. The relatively low pressure hot gases coming out from the exhaust section 110 may be sent out to the atmosphere, to a combined cycle regeneration plant, and/or to a recirculation duct of a heat exchanger.

FIG. 2 is a block diagram of one example system 200 that may be utilized to control fuel flow to a turbine or a turbine component, according to an illustrative embodiment of the invention. The system 200 may include a fuel flow section 205, one or more sensors 210, and a controller 215. In one embodiment, the fuel flow section 205 may be operable to provide fuel, such as a compressible fuel, to a turbine or turbine component. The sensors 210 may monitor various parameters associated with the fuel flow and provide measurements data to the controller 215. The controller 215 may receive the measurements data and model the fuel flow within the fuel flow section 205 and the turbine component. Based at least in part on the modeling of the fuel flow, actuators, and/or valve characteristics, the controller 215 may adjust or otherwise control the fuel flow using any number of valves in the fuel flow section 205.

The fuel flow section 205 may be operable to provide fuel, such as a compressible fuel, to a turbine or a turbine component. As shown in FIG. 2, the fuel may be provided by the fuel flow section 205 from a fuel supply 220 to a suitable turbine component, such as a combustor chamber 225. The fuel supply 220 may be any suitable supply and/or source of fuel as desired in various embodiments of the invention, for example, a piped in supply of fuel, a pipeline of fuel, a storage tank of fuel, etc.

The fuel flow section 205 may include any number of suitable flow channels, pipes, and/or manifolds that facilitate the supply of fuel from the fuel supply 220 to the combustor chamber 225. In the example embodiment of FIG. 2, the fuel flow section 205 may include a first flow channel 230, a second flow channel 232, a third flow channel 234, and a fourth flow channel 236. Any number of suitable valves or similar devices may be utilized to control the fuel flow through the flow channels of the fuel flow section 205. For example, as shown in FIG. 2, a stop ratio valve 238, a first gas control valve 240, and a second gas control valve 242 may facilitate the control of the fuel flow through the fuel flow section 205. The valves 238, 240, 242 may be opened and/or closed as desired to control the fuel flow.

With continued reference to FIG. 2, a fuel flow may be received from the fuel supply 220 by the first flow channel 230 and provided to the second flow channel 232 via the stop ratio valve 238. The stop ratio valve 238 may be adjusted to maintain and/or attempt to maintain a relatively constant pressure in the second flow channel 232. For example, the stop ratio valve 238 may be adjusted in an attempt to maintain a relatively constant pressure in the volume of fuel in the second flow channel. The second flow channel 232 may include any number of branches and/or forks that facilitate providing a fuel flow to multiple turbine components and/or to multiple positions within a turbine component. As shown in FIG. 2, the second flow channel 232 may include two branches that facilitate providing a fuel flow to two respective inlets associated with the combustor chamber 225.

With further reference to FIG. 2, each branch of the second flow channel 232 may be associated with a respective control valve. For example, a first control valve 240 may be associated with a first branch of the second flow channel 232 and a second control valve 242 may be associated with a second branch of the second flow channel 232. The control valves 240, 242 may be utilized to control the amount of fuel that is provided downstream from the second flow channel 232. For example, the first control valve 240 may be utilized to control the amount of fuel that is provided from the second flow channel 232 to a third flow channel 234 that is operable to provide fuel to a first inlet of the combustor chamber 225. Similarly, the second control valve 242 may be utilized to control the amount of fuel that is provided from the second flow channel 232 to a fourth flow channel 236 that is operable to provide fuel to a second inlet of the combustor chamber 225. Each of the control valves 240, 242 may be adjusted as desired to control the amount of fuel that is allowed to pass through the valves 240, 242. For example, in order to increase the amount of fuel that is allowed to pass through a valve 240, 242, the valve 240, 242 may be adjusted to a more open position than the current position of the valve 240, 242. As another example, in order to decrease the amount of fuel that is allowed to pass through a valve 240, 242, the valve 240, 242 may be adjusted to a more closed position that the current position of the valve 240, 242. As desired, the valves 240, 242 may be controlled independently of one another. For example, one valve may open while the other valve closes with the result of either a net increase or a net decrease in fuel. Additionally, in certain embodiments, the valves 238, 240, 242 may include one or more processor or microprocessor driven control units that control the operation of the valves 238, 240, 242. As desired, these control units may provide information associated with the valves 238, 240, 242 to other components of the system 200, for example, to the controller 215.

A wide variety of different types of fuel may be provided to a turbine and/or a turbine component as desired in various embodiments of the invention. According to an aspect of the invention, the fuel may be a compressible fuel. One example of a compressible fuel that may be utilized in various embodiments of the invention is a gas fuel, such as natural gas. In one embodiment, a gas fuel may be supplied to a combustor of a gas turbine.

According to an aspect of the invention, the compressible nature of the fuel may be taken into account when the fuel flow is adjusted or changed. It may take a certain period of time for a compressible fuel, such as natural gas, to adjust to a new combustor fuel flow level when the one or more valves that control the fuel flow are changed. For example, if the fuel flow is decreased by adjusting a control valve to a more closed position, then there may be a certain amount of excess fuel that is present in the flow channels downstream of the control valve, and it may take some time for that excess fuel to bleed out of the flow channels and into the combustor 225. As another example, if the fuel flow is increased by adjusting a control valve to a more open position, it may take time for an adequate amount of fuel to flow into the flow channels downstream of the control valve and to reach an appropriate pressure to achieve a desired flow rate into the combustor 225.

Embodiments of the invention may facilitate modeling the flow of fuel to a turbine or turbine component. For example, various embodiments of the invention may model the flow of fuel in the fuel flow section 205, the operation of various components of the fuel flow section 205, and/or the behavior of fuel in one or more turbine components that receive the fuel. The modeling may be utilized to predict the behavior of the fuel flow if and when the fuel flow is adjusted. In certain embodiments, as explained in greater detail below, the modeling of the fuel flow may be taken into account when the fuel flow is adjusted. In this regard, the fuel flow may be adjusted more aggressively in order to achieve relatively rapid adjustments to fuel flow.

In certain embodiments of the invention, the modeling of the fuel flow may be based at least in part on measurements data associated with the fuel flow. In this regard, the fuel flow may be modeled in real time or near real time. As desired, one or more sensors 210 may be utilized to facilitate monitoring the fuel flow and obtaining measurements data associated with the fuel flow. The sensors 210 may include any number of sensors that facilitate the measurement of various parameters associated with the fuel flow to a turbine component, such as the combustor chamber 225 of a turbine. A wide variety of different parameters may be measured and/or monitored by the sensors 210 as desired in various embodiments of the invention. These parameters may be associated with various components of the fuel flow section 205, for example, the first flow channel 230, the second flow channel 232, the third flow channel 234, the fourth flow channel 236, the stop ratio valve 238, the control valves 240, 242, and/or the combustor chamber 225. Examples of parameters that may be measured and/or monitored in various embodiments of the invention include, but are not limited to, one or more pressures associated with a fuel flow in one or more respective components of the fuel flow section 205, one or more temperatures associated with a fuel flow in one or more respective components of the fuel flow section 205, various positions associated with the valves 238, 240, 242, and or various parameters associated with one or more turbine components that receive the fuel flow, such as an effective area associated with a nozzle of the combustor chamber 225. Additionally, a wide variety of different types of sensors may be utilized in various embodiments of the invention. In certain embodiments, the sensors that are utilized may be based at least in part on the parameters that are measured and/or monitored. For example, suitable pressure sensors may be utilized to take pressure readings and suitable temperature sensors may be utilized to take temperature readings. Additionally, as desired in various embodiments of the invention, the sensor response of one or more utilized sensors 210 may be modeled to further improve the control of the compressible fuel flow.

The sensors 210 may measure various parameters associated with the fuel flow section 205 and, in certain embodiments, the sensors 210 may provide measurements data to the controller 215. In some embodiments, the measurements data may be provided to the controller 215 in real time or near real time. Additionally, the measurements data may be provided to the controller 215 via any number of suitable connections, for example, direct wiring connections in which analog and/or digital measurements data is provided to an input interface associated with the controller 215. In embodiments where analog measurements data is provided to the controller 215, the controller 215 may utilize one or more suitable analog-to-digital converters to transform the analog data into digital data that may be processed by the controller 215. As another example of suitable connections that may facilitate the communication of measurements data from the sensors 210 to the controller 215, one or more suitable networks or network connections may be utilized as desired, for example, a local area network, wide area network, the Internet, a cellular network, a radio frequency (RF) network, a Bluetooth network connection, a Wi-Fi network connection, any suitable wired network connection, any suitable wireless network connections, etc.

The controller 215 may be a processor driven device that facilitates modeling the fuel flow and/or adjusting the fuel flow based at least in part on the modeling. For example, the controller 215 may include any number of special purpose computers or particular machines, application specific circuits, programmable logic controllers (PLC), microcontrollers, personal computers, minicomputers, mainframe computers, supercomputers, and the like. In certain embodiments, the operations of the controller 215 may be controlled by computer-executed or computer-implemented instructions that are executed by one or more processors associated with the controller 215. The instructions may be embodied in one or more software components as desired in various embodiments of the invention. The execution of the instructions may form a special purpose computer or other particular machine that is operable to model the fuel flow and/or adjust or control the fuel flow based at least in part on the modeling. The one or more processors that control the operations of the controller 215 may be incorporated into the controller 215 and/or in communication with the controller 215 via one or more suitable networks. In certain embodiments of the invention, the operations and/or control of the controller 215 may be distributed amongst several processing components.

The controller 215 may include one or more processors 251, one or more memory devices 252, one or more input/output ("I/O") interface(s) 253, and one or more network interface(s) 254. The one or more memory devices 252 may be any suitable memory devices, for example, caches, read only memory devices, random access memory devices, magnetic storage devices, etc. The one or more memory devices 252 may store data, executable instructions, and/or various program modules utilized by the controller 215, for example, measurements data 255, data 256 associated with the fuel flow section 205, an operating system 257, a fuel control module 258, and one or more fuel flow models 259. The measurements data 255 may include any measurements data received from the one or more sensors 210, such as pressure measurements and/or temperature measurements. The data 256 may include any other suitable data associated with the fuel flow section 205, for example, data received from the one or more valves 238, 240, 242, stored data associated with the one or more valves 238, 240, 242, data received from other components of the fuel flow section 205, stored data associated with other components of the fuel flow section 205 (e.g., diameter of flow channels, length of flow channels, etc.), data received from one or more turbine components, stored data associated with one or more turbine components, data received from one or more external control systems 270, and/or data received from one or more data sources 275. The operating system (OS) 257 may include executable instructions and/or program modules that facilitate and/or control the general operation of the controller 215. For example, the OS 257 may facilitate the execution of other software programs and/or program modules by the processors 251.

According to an aspect of the invention, the controller 215 may include and/or be associated with one or more fuel flow models 259 that facilitate modeling and/or predicting the behavior and/or flow of the fuel within the fuel flow section 205 and/or various turbine components. The fuel flow models 259 may utilize the measurements data 255 and/or the data 256 to model the fuel flow within the fuel flow section 205. Additionally, the fuel flow models 259 may model the behavior and/or operation of various components of the fuel flow section 205, such as the behavior and/or operation of the valves 238, 240, 242 and/or the sensor response of one or more sensors 210 that are utilized. In certain embodiments, the modeling may be conducted in real time or near real time as measurements data is received from the sensors 210. As desired, the modeling may be utilized in the control of the fuel flow within the fuel flow section 205. For example, the fuel control module 258 may utilize information or data provided by the fuel flow models 259 to control the fuel flow by adjusting the various valves 238, 240, 242 associated with the fuel flow section 205. As a result of utilizing information provided by the fuel flow models 259 when controlling the fuel flow, the fuel control module 258 may control the fuel flow in a relatively aggressive fashion to obtain more rapid changes in the fuel flow.

A wide variety of different models may be utilized as desired in various embodiments of the invention. As shown in FIG. 2, a manifold model 260, a valve model 261, and/or a combustor model 262 may be utilized; however, any number of models may be utilized. The manifold model 260 may model the fuel and/or fuel flow within one or more manifolds or flow channels associated with the fuel flow section 205. In one embodiment, the manifold model 260 may model the compressible volume of fuel between a control valve 240, 242 and the combustor chamber 225 of a turbine. A wide variety of factors may be taken into account by the manifold model. For example, the manifold model 260 may model the compressible dynamics and/or the volume dynamics of the fuel and/or fuel flow. Various measurements may be utilized as desired by the manifold model 260, such as temperature measurements from within a manifold, pressure measurements from within a manifold, fuel flow rate measurements associated with a valve that supplies fuel to a manifold, etc. These measurements may be utilized to model the fuel flow within the data and/or to predict changes in the fuel flow if and when adjustments are made to the fuel flow. Additionally, other data may be utilized as desired by the manifold model 260, such as pressure and heat loss characteristics and/or prestored data associated with a manifold, for example, a length of the manifold, a diameter of the manifold, a volume of the manifold, etc. The other data may be taken into account when modeling and/or predicting the fuel flow. The modeled and/or predicted behavior of the fuel flow in the manifold may be provided by the manifold model 260 to the fuel control model 258. In this regard, the compressible dynamics and/or volume dynamics of the fuel and/or fuel flow may be taken into account when adjusting the fuel flow in the fuel flow section 205.

The valve model 261 may model the operation of one or more valves utilized in the fuel flow section 205, for example, the control valves 240, 242 and/or the stop ratio valve 238. The operation of the valve model 261 will be described with reference to a control valve 240; however, as desired in various embodiments, any number of valves may be modeled. As desired, the valve model 261 may model and/or predict the operation of the control valves 240. The current positioning of the control valve 240 may be received by the model from the sensors 210 or from a control unit or controller included in or associated with the control valve 240. Additionally, other data associated with the control valve 240 may be received and/or utilized to model and/or predict the operation of the control valve 240, such as functional and/or operational characteristics of the control valve 240. As one example, data associated with the movement capabilities of the valve and/or the oscillation characteristics of the valve 240 may be utilized by the valve model 261 along with the current positioning of the valve 240 in order to model and/or predict an amount of time that it will take for the valve 240 to be moved to a new position. The modeled and/or predicted operation of the valve 240 may be supplied by the valve model 261 to the fuel control model 258. In this regard, the operational characteristics of the valve 240 may be taken into account when adjusting the fuel flow in the fuel flow section 240.

The combustor model 262 may model and/or predict the fuel flow and/or behavior of fuel within the combustor chamber 225. Although a combustor model 262 is illustrated in FIG. 2, other types of models may be utilized as desired for modeling fuel characteristics in other turbine components. A wide variety of measurements, operational characteristics, parameters, and/or other data may be taken into account by the combustor model 262 as desired in various embodiments of the invention, for example, the effective area of fuel nozzles within the combustor chamber 225, chamber pressure, chamber temperature, etc. The modeled and/or predicted fuel flow to the combustor chamber 225 may be supplied by the combustor model 262 to the fuel control model 258. In this regard, the fuel flow behavior within the combustor chamber 225 may be taken into account when adjusting the fuel flow in the fuel flow section 240.

The fuel control module 258 may facilitate the adjustment of the fuel flow within the fuel flow section 240. According to an aspect of the invention, various modeling of the fuel flow, valves, and/or turbine components may be taken into account by the fuel control module 258 when adjusting the fuel flow. For example, data may be received by the fuel control module 258 from the fuel flow models 259, and the received data may be utilized in adjusting the fuel flow to a target fuel flow. In certain embodiments, the fuel flow may be adjusted in response to a transient event associated with a turbine, for example, a load rejection, a change from a steady state condition, a rapid load or unload, a step to island mode, a dead bus closure, a load shed, a deal load pickup, etc. As a fuel flow is adjusted, the compressible nature of the fuel may be taken into account using the fuel flow models 259. Additionally, the capabilities and/or operation of the valves, such as control valve 240, may be taken into account.

As one example of adjusting a fuel flow, the turbine may be operating at a steady state. Based on a transient event, a determination may be made to adjust the fuel flow to a new target flow, for example, a reduced fuel flow. In conventional fuel control systems, one or more control valves may be adjusted to a positioning associated with the target flow; however, the compressible nature of the fuel may lead to delays in reaching the target flow into the combustor 225. In other words, the target combustor flow may not be reached once the control valves positioning has been changed. In various embodiments of the invention, the fuel flow may be adjusted relatively aggressively in order to reach the target flow in a more expeditious manner. For example, the valve fuel flow may be adjusted to a level that overcompensates for or goes beyond a change of the valve position to that for the target flow in order to account for the compressible nature of the fuel and the delayed effect on combustor fuel flow. The valve position may then be adjusted to that for the target flow. In this regard, adjustments to fuel flow may be made relatively quickly. A few examples for adjusting the fuel flow in accordance with embodiments of the invention are provided below with reference to FIGS. 3, 4A, and 4B.

The one or more input/output ("I/O") interfaces 253 may facilitate communication between the controller 215 and one or more input/output devices, for example, the sensors 210, a universal serial bus port, a serial port, a disk drive, a CD-ROM drive, infrared receiver, and/or one or more user interface devices, such as, a display, keyboard, mouse, keypad, control panel, touch screen display, remote control, microphone, etc. that facilitate user interaction with the controller 215. The one or more I/O interfaces 253 may be utilized to receive or collect measurements data and/or other data from a wide variety of sensors and/or input devices.

The one or more network interfaces 254 may facilitate connection of the controller 215 to one or more suitable networks 280, for example, a local area network (LAN), a wide area network (WAN), the Internet, a cellular network, a radio frequency network, a Bluetooth enabled network, a Wi-Fi network, any wired network, any wireless network or any other network capable of transmitting data. In this regard, the controller 215 may receive measurements data and/or control data from other network devices and/or systems, such as, the data sources 275 and/or the external control systems 270. Additionally, in some embodiments, the network interfaces 254 may be utilized to receive measurements data from the sensors 210.

As desired in various embodiments of the invention, the controller 215 may receive measurements data from the one or more sensors 210. Additionally, in certain embodiments, the controller 215 may receive measurements data and/or other data from one or more other devices, network devices, systems, and/or external data sources 275 through any number of suitable networks 280, such as, a local area network (LAN), a wide area network (WAN), the Internet, a cellular network, a radio frequency network, a Bluetooth enabled network, a Wi-Fi network, any wired network, any wireless network, or any other network capable of transmitting data. In certain embodiments of the invention, an external data source 275 may be a source of stored data associated with the operation of the turbine, one or more components of the turbine, one or more components of the fuel flow section 205, and/or the behavior of the fuel within the system 100. In certain embodiments, the controller 215 may simultaneous process real time data or near real time data received from the sensors 210 and stored data from the external data sources 275 to provide a more accurate model and/or prediction of the fuel flow. In other embodiments, the external data source 275 may include real time or near real time data and may be coupled to the controller 215 either independently or in conjunction with the one or more sensors 210 to provide measurement data to the controller 215. Moreover, in various embodiments of the invention, the controller 215 may receive data from and/or be at least partially controlled by one or more external control systems 270 that are in communication with the controller 215 via one or more suitable networks, such as network 280.

As desired, embodiments of the invention may include a system 200 with more or less than the components illustrated in FIG. 2. Additionally, embodiments of the invention may be applicable for use in a wide variety of different machines, for example, gas turbines, steam turbines, or any other machine that receives and/or utilizes a compressible fuel.

FIG. 3 is a flowchart illustrating one example method 300 for controlling fuel flow to a turbine, according to an illustrative embodiment of the invention. The method 300 may utilize various modeling and/or prediction associated with the fuel flow when adjusting the fuel flow. In this regard, the compressible nature of the fuel may be taken into account when the fuel flow is adjusted.

The method 300 may begin at block 305. At block 305, one or more parameters associated with a fuel flow to a turbine component, such as the third flow channel 234, fourth flow channel 236, and/or combustor chamber 225 illustrated in FIG. 2, may be monitored. A wide variety of parameters associated with the fuel flow may be monitored as desired in various embodiments of the invention, for example, one or more pressures associated with a fuel flow in one or more respective components of a fuel flow section, such as fuel flow section 205, one or more temperatures associated with a fuel flow in one or more respective components of the fuel flow section 205, various positions associated with valves that control the fuel flow, such as valves 238, 240, 242, and or various parameters associated with one or more turbine components that receive the fuel flow, such as an effective area associated with a nozzle of the combustor chamber 225. As desired, the parameters may be monitored by one or more suitable sensors, such as sensors 210 illustrated in FIG. 2.

At block 310, the measurements data associated with the monitored parameters may be communicated from the sensors 210 to one or more models associated with the fuel flow, such as the fuel flow models 259 illustrated in FIG. 2. For example, the measurements data may be communicated to a controller, such as controller 215, that is operable to execute the fuel flow models 259, and the controller 215 may respectively provide relevant measurements data to each fuel flow model. The measurements data may be communicated to the controller 215 via one or more suitable input/output interfaces and/or via one or more suitable networks, such as I/O interfaces 253 and networks 280 illustrated in FIG. 2.

At block 315, which may be optional in certain embodiments of the invention, other data associated with the fuel flow may be communicated to the one or more fuel flow models 259. A wide variety of other data may be utilized as desired in various embodiments of the invention, such as dimensions associated with flow channels, operating characteristics and/or capabilities associated with one or more control valves 238, 240, 242, and/or operating characteristics associated with one or more turbine components. For example, the data may be communicated to the controller 215, and the controller 215 may respectively provide relevant data to each fuel flow model. The data may be communicated to the controller 215 via one or more suitable input/output interfaces and/or via one or more suitable networks, such as I/O interfaces 253 and networks 280 illustrated in FIG. 2. As desired, the data may be received from control units associated with various turbine components, such as a valve control unit, from one or more external data sources, and/or from one or more external control systems.

At block 320, the fuel flow may be modeled using at least a portion of the measurements data and/or other data. The one or more fuel flow models 259 may be utilized to model the fuel flow and/or predict the behavior of the fuel flow. In certain embodiments, the fuel flow may be monitored in real time or near real time as various parameters associated with the fuel flow are monitored. By modeling the fuel flow, the compressible nature of the fuel and the effects of the compressible nature on adjustments to the fuel flow may be taken into account when the fuel flow is adjusted. For example, the compressible dynamics and/or the volume dynamics of the fuel flow may be taken into account. Additionally, in certain embodiments, the capabilities and/or operation of the one or more valves utilized to adjust the fuel flow may be taken into account when the fuel flow is adjusted. For example, the time that it takes to adjust a valve to a new position and/or the oscillation characteristics of the valve may be taken into account. Additionally, in certain embodiments, the capabilities and/or operation of one or more turbine components may be taken into account when the fuel flow is adjusted, for example, the pressure in the combustor component 225, the effective area of one or more fuel nozzles of the combustor component 225, etc.

At block 325, a new target fuel flow may be identified. For example, a turbine may be operating at a steady state and a determination may be made to operate the turbine in a different state. In certain embodiments, the determination may be made in response to a transient event. The new state of the turbine may have an associated fuel flow, which may be referred to as the new target fuel flow.

At block 330, the fuel flow may be adjusted to the target fuel flow based at least in part on the predictive modeling of the fuel flow. Embodiments of the invention may make adjustments to the fuel flow more rapidly than conventional systems due to improved understanding of the fuel flow and control capabilities associated with the fuel flow section 205. For example, the compressible nature of the fuel and/or the capabilities of the control valves 240, 242 may be taken into account when adjusting the fuel flow. A few examples of adjusting the fuel flow to a target fuel flow will now be discussed.

One example of adjusting the fuel flow to a target flow involves adjusting the fuel flow to a target level that is less than the current fuel flow. In a conventional system, when the fuel flow is decreased, a certain amount of fuel remaining in the manifolds or flow channels will take some time to bleed out, resulting in delays in reaching the target level in the combustor 225. Embodiments of the invention, however, may take the compressible nature of the fuel into account when adjusting the fuel flow. Once a target fuel flow has been identified, a control valve 240 may be adjusted to a position associated with a fuel flow that is less than the target fuel flow. For example, the control valve 240 may be adjusted to a closed position. In this regard, the fuel flow may be reduced relatively rapidly and the fuel remaining in the flow channels may bleed out relatively rapidly. The behavior of the fuel flow within the flow channels, the capabilities of the control valve 240, and/or the behavior of the fuel flow within a turbine component that receives the fuel flow (e.g., a combustor chamber) may be modeled. Based at least in part on the modeling, a determination may be made as to when the valve should be reopened and/or repositioned to a positioning associated with the target fuel flow. In this regard, the fuel flow may be reduced to a target level in a relatively rapid manner.

Another example of adjusting the fuel flow to a target flow involves adjusting the fuel flow to a target level that is greater than the current fuel flow. In a conventional system, when the fuel flow is increased, some delays may occur due to compression of an increased fuel flow when it enters a flow channel. Embodiments of the invention, however, may take the compressible nature of the fuel into account when adjusting the fuel flow. Once a target fuel flow has been identified, a control valve 240 may be adjusted to a position associated with a fuel flow that is greater than the target fuel flow. For example, the control valve 240 may be adjusted to a fully opened position. In this regard, the fuel flow may be increased relatively rapidly and a desired pressure for a target fuel flow may be achieved in the flow channels relatively rapidly. The behavior of the fuel flow within the flow channels, the capabilities of the control valve 240, and/or the behavior of the fuel flow within a turbine component that receives the fuel flow (e.g., a combustor chamber) may be modeled. Based at least in part on the modeling, a determination may be made as to when the valve should be partially closed and/or repositioned to a positioning associated with the target fuel flow. In this regard, the fuel flow may be increased to a target level in a relatively rapid manner.

The method 300 may end following block 330.

The operations described in the method 300 of FIG. 3 do not necessarily have to be performed in the order set forth in FIG. 3, but instead may be performed in any suitable order. Additionally, in certain embodiments of the invention, more or less than all of the elements or operations set forth in FIG. 3 may be performed.

FIGS. 4A and 4B are charts that illustrate example changes in fuel flow that may be facilitated by embodiments of the invention. FIG. 4A is a chart 400 that illustrates an example reduction in fuel flow in a conventional system. The chart 400 plots the fuel flow over time. Illustrated in FIG. 4A are a calculated valve fuel flow 405 and an actual combustor fuel flow 410. The calculated fuel flow 405 represents a fuel flow that is expected by the conventional system as the fuel flow is adjusted, for example, as one or more valves are closed from a position associated with an initial fuel flow 415 to a position associated with a final fuel flow 420. The actual fuel flow 410 illustrates the actual fuel flow as the one or more valves are adjusted. As shown, due to the compressible nature of the fuel, it typically takes a greater amount of time than calculated for the fuel flow to be reduced to the final fuel flow 420. These delays may lead to losses in efficiency of a turbine and, in some instances, to loss of flame and/or increased wear and tear, reduced life cycle, and/or damage to the turbine and/or various turbine components.

FIG. 4B is a chart 425 that illustrates an example reduction in fuel flow in accordance with embodiments of the invention. The chart 425 plots the fuel flow over time. Illustrated in FIG. 4B are a calculated valve fuel flow 430 and an actual combustor fuel flow 435. The calculated fuel flow 430 represents a fuel flow that is expected as the fuel flow is adjusted, for example, as one or more valves are adjusted. The actual fuel flow 410 illustrates the actual fuel flow as the one or more valves are adjusted. As shown, in order to reduce the fuel flow to a target level, the fuel flow may be reduced from an initial fuel flow 440 to a fuel flow 445 that is less than a target fuel flow or final fuel flow 450. Based at least in part on modeling the fuel flow, components of a fuel flow system, and/or various turbine components, the fuel flow may then be adjusted to the final fuel flow 450. In this regard, the fuel flow may be adjusted in a relatively aggressive and/or a relatively rapid manner. As shown, the actual fuel flow 435 may be decreased to the final fuel flow 450 in a more rapid manner than in conventional systems. The more rapid adjustment of the fuel flow may lead to efficiency gains within the turbine and, in some instances, to decreased wear and tear of various turbine components.

Embodiments of the invention may be applicable to different types of turbines, such as gas turbine, steam turbines, and the like. Embodiments of the invention may also be applicable to other types of machines that receive and/or utilize a compressible fuel supply or a compressible flow, for example, reciprocating engines, furnaces, etc. It will be apparent that any example taken/provided in the foregoing specification is merely provided for explanation purposes and does not limit the scope of the invention.

The invention is described above with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general purpose computer, a special-purpose computer, a processor, or other programmable data processing apparatus to produce a particular machine, such that the instructions that execute on the computer, processor, or other programmable data processing apparatus create means for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special purpose hardware and computer instructions.

While the invention has been described in connection with what is presently considered to be the most practical and various embodiments, it is to be understood that the invention is not to be limited to the disclosed embodiments, but on the contrary, is intended to cover various modifications and equivalent arrangements included within the spirit and scope of the appended claims.

This written description uses examples to disclose the invention, including the best mode, and also to enable any person skilled in the art to practice the invention, including making and using any devices or systems and performing any incorporated methods. The patentable scope the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for controlling fuel flow to a turbine component, the method comprising:
monitoring, by a controller comprising one or more computers, one or more parameters associated with a fuel flow of fuel to a turbine component;
modeling, by the controller based at least in part on the one or more monitored parameters, compressibility of the fuel and an associated effect of the compressibility of the fuel on the fuel flow; and
adjusting, by the controller, the fuel flow to a target flow based at least in part on the modeling.

2. The method of claim 1, wherein monitoring one or more parameters associated with a fuel flow comprises monitoring at least one of a rate of flow through one or more valves that facilitate adjusting the fuel flow, a pressure associated with the fuel flow, or a temperature associated with the fuel flow.

3. The method of claim 1, wherein modeling the effect of the compressibility of the fuel on the fuel flow comprises at least one of modeling compressible dynamics associated with the fuel flow or modeling volume dynamics associated with the fuel flow.

4. The method of claim 1, wherein adjusting the fuel flow to a target flow comprises actuating one or more valves that control the amount of the fuel supplied to the turbine component.

5. The method of claim 1, wherein adjusting the fuel flow to a target flow comprises: increasing the fuel flow to a fuel flow greater than the target flow; and decreasing the fuel flow to the target flow based at least in part on the modeling of the fuel flow.

6. The method of claim 1, wherein adjusting the fuel flow to a target flow comprises: decreasing the fuel flow to a fuel flow less than the target flow; and increasing the fuel flow to the target flow based at least in part on the modeling of the fuel flow.

7. The method of claim 1, further comprising:
modeling, by the controller, the control capabilities associated with one or more values that facilitate adjusting the fuel flow,
wherein adjusting the fuel flow to a target flow comprises adjusting the fuel flow based at least in part on the modeling of the control capabilities.

8. A system for controlling fuel flow to a turbine component, the system comprising:
one or more sensors operable to monitor one or more parameters associated with a fuel flow of fuel to a turbine component; and
one or more processors operable to receive measurements data from the one or more sensors, utilize at least a portion of the received measurements data to model compressibility of the fuel flow and an associated effect of the compressibility of the fuel on the fuel flow, and adjust the fuel flow to a target flow based at least in part on the modeling.

9. The system of claim 8, wherein the one or more sensors are operable to monitor at least one of a rate of flow through one or more valves that facilitate adjusting the fuel flow, a pressure associated with the fuel flow, or a temperature associated with the fuel flow.

10. The system of claim 8, wherein the one or more processors are operable to model the effect of the compressibility of the fuel on the fuel flow by modeling at least one of compressible dynamics associated with the fuel flow, volume dynamics associated with the fuel flow, or control capabilities associated with the fuel flow.

11. The system of claim 8, wherein the one or more processors are operable to adjust the fuel flow to the target flow by actuating one or more valves that control the amount of the fuel supplied to the turbine component.

12. The system of claim 8, wherein the one or more processors are operable to adjust the fuel flow to the target flow by:
increasing the fuel flow to a fuel flow greater than the target flow; and
decreasing the fuel flow to the target flow based at least in part on the modeling of the fuel flow.

13. The system of claim 8, wherein the one or more processors are operable to adjust the fuel flow to the target flow by:
decreasing the fuel flow to a fuel flow less than the target flow; and
increasing the fuel flow to the target flow based at least in part on the modeling of the fuel flow.

14. The system of claim 8, further comprising:
one or more valves operable to control the fuel flow,
wherein the one or more processors are operable to adjust the fuel flow by controlling a respective positioning of each of the one or more valves.

15. The system of claim 8, wherein the one or more processors are further operable to:
model the control capabilities associated with one or more valves that facilitates adjusting the fuel flow; and
adjust the fuel flow to the target flow based at least in part on the modeling of the control capabilities.

16. A method for controlling a valve associated with a fuel flow to a turbine component, the method comprising:
measuring data associated with the fuel flow downstream of the valve;
predicting, by a controller comprising one or more computers, a behavior of the fuel flow based at least in part on modeling one or more functional capabilities of the valve and, utilizing the one or more monitored parameters, compressibility of the fuel and an associated effect of the compressibility of the fuel on the fuel flow; and
adjusting, by the controller, the positioning of the valve to alter the fuel flow based at least in part on the predicted behavior of the fuel flow.

17. The method of claim 16, wherein measuring data comprises measuring data associated with at least one of a rate of fuel flow through the valve, a pressure associated with the fuel flow, or a temperature associated with the fuel flow.

18. The method of claim 16, wherein modeling the effect of the compressibility of the fuel on the fuel flow comprises modeling compressible dynamics associated with the fuel flow or modeling volume dynamics associated with the fuel flow.

19. The method of claim 16, wherein adjusting the positioning of the valve to alter the fuel flow comprises: adjusting the positioning of the valve to increase the fuel flow to a fuel flow greater than a target flow; and subsequently adjusting the positioning of the valve to decrease the fuel flow to the target fuel flow based at least in part on the predicted behavior of the fuel flow and the one or more functional capabilities of the valve.

20. The method of claim 16, wherein adjusting the positioning of the valve to alter the fuel flow comprises: adjusting the positioning of the valve to decrease the fuel flow to a fuel flow less than a target flow; and subsequently adjusting the positioning of the valve to increase the fuel flow to the target fuel flow based at least in part on the predicted behavior of the fuel flow and the one or more functional capabilities of the valve.

* * * * *